United States Patent [19]
Simpson et al.

[11] Patent Number: 6,016,999
[45] Date of Patent: Jan. 25, 2000

[54] SPACECRAFT PLATFORMS

[75] Inventors: David M. Simpson; Joseph Daniel McCaughey, both of Hants; Charles David Hall, Havant, all of United Kingdom

[73] Assignee: Matra Marconi Space UK Limited, Middlesex, United Kingdom

[21] Appl. No.: 09/109,385

[22] Filed: Jul. 2, 1998

[30] Foreign Application Priority Data

Jul. 5, 1997 [GB] United Kingdom .................. 9714322
Feb. 25, 1998 [GB] United Kingdom .................. 9803918

[51] Int. Cl.⁷ ....................................... B64G 1/00
[52] U.S. Cl. ................... 244/158 R; 244/172; 244/173
[58] Field of Search .................. 244/158 R, 172, 244/173

[56] References Cited

U.S. PATENT DOCUMENTS

| | | | |
|---|---|---|---|
| 3,587,999 | 6/1971 | Miniovitch | 244/158 R |
| 3,635,425 | 1/1972 | Swet | 244/173 |
| 3,783,029 | 1/1974 | Dillard et al. | 244/158 R |
| 4,292,375 | 9/1981 | Ko | 428/593 |
| 4,630,791 | 12/1986 | Chapman | 244/173 |
| 4,854,526 | 8/1989 | Rochefort | 244/158 R |
| 4,964,597 | 10/1990 | Hijazi | 244/159 |
| 5,027,892 | 7/1991 | Bannon et al. | 244/158 R |
| 5,052,640 | 10/1991 | Chang | 244/173 |
| 5,131,955 | 7/1992 | Stern et al. | 244/173 |
| 5,310,141 | 5/1994 | Homer et al. | 244/158 R |
| 5,386,953 | 2/1995 | Stuart | 244/173 |
| 5,520,747 | 5/1996 | Marks | 244/173 |
| 5,527,001 | 6/1996 | Stuart | 244/158 R |
| 5,633,644 | 5/1997 | Schussler et al. | 342/455 |
| 5,642,122 | 6/1997 | Lockie et al. | 343/881 |
| 5,715,573 | 2/1998 | Holemans | 244/173 |
| 5,743,492 | 4/1998 | Chan et al. | 244/118.2 |
| 5,785,280 | 7/1998 | Baghdasarian | 244/173 |

FOREIGN PATENT DOCUMENTS

| | | |
|---|---|---|
| 0064917 | 11/1982 | European Pat. Off. . |
| 0195554 | 5/1986 | European Pat. Off. . |
| 0195554 | 9/1986 | European Pat. Off. . |
| 0692425 | 1/1996 | European Pat. Off. . |
| 0849171A1 | 6/1998 | European Pat. Off. . |
| 127836 | 9/1968 | United Kingdom . |
| 1268841 | 3/1972 | United Kingdom . |
| WO89/01437 | 2/1989 | WIPO . |
| WO96/21250 | 7/1996 | WIPO . |
| WO96/21250 | 11/1996 | WIPO . |

OTHER PUBLICATIONS

Patent Abstract of Japan, Publication No. 05147596, Publication date Jun. 15, 1993.
Patent Abstract of Japan, Publication No. 08058700, Publication date Mar. 3, 1996.
Patent Abstract of Japan, Publication No. 08230796, Publication date Sep. 10, 1996.

*Primary Examiner*—J. Woodrow Eldred
*Attorney, Agent, or Firm*—Donald C. Casey, Esq.

[57] ABSTRACT

A spacecraft platform essentially having two or more panels hinged at the base and contained for launch in a fairing. The panels are hinged and latched in an open deployment and bear, for example, a SAR antenna or an interferometer. The rear faces of the panels are provided with stiffening ribs, webs and struts and carry elements of the payload module and service module which are normally separate structures on a conventional satellite.

17 Claims, 10 Drawing Sheets

SPACECRAFT PLATFORMS

BACKGROUND OF THE INVENTION

1. Field of the Invention

This invention relates to spacecraft platforms.

2. Description of the Prior Art

Referring to FIG. 1a, part of a known satellite is shown in simplified form. The satellite has a synthetic aperture radar (SAR) antenna 1, and the associated electronics are contained in payload module 2, which supports the antenna 1 by means of struts 4. Also connected to the payload module 2 is a service module 3, containing, principally, a power supply, fuel and thrusters for adjusting the attitude and/or altitude of satellite, telemetry equipment and attitude and orbit control systems (AOCS). A solar array is also provided but has not been shown in FIGS. 1a, 1b. FIG. 1b shows in simplified form the satellite of FIG. 1a inside a fairing 5 when stowed for launch. The payload would be mounted at the top of a suitable launch vehicle (not shown). It will be seen that the antenna is stowed by being folded into four sections above the payload module 2.

One of the areas which requires a complex design solution is the SAR antenna itself. The hinges between the sections of the antenna and the associated drive mechanisms to achieve deployment are obviously critical components, and a considerable amount of design effort is required to be put into the thermo-elastic analysis of the structure to assess the range of possible distortions that may occur in a wide range of in-orbit scenarios. Even testing of the antenna on Earth is a problem, because the deployed antenna may not be self-supporting on Earth, and complicated and expensive support structures are required in view of this. Yet another problem may arise from the vibrations during launch because it is relatively difficult to tether the stowed antenna 1 to the payload module beneath.

Structurally, the payload module 2 and the service module 3 essentially consist of a box-like structure formed by the outer walls of the modules shown. In other known satellites, the modules are structurally based on a cylinder running the height or part of the height of the modules, and the outer panels are supported by radial extensions from this cylinder.

Another variant, the Milstar satellite, shown schematically in FIGS. 2a and 2b retains the service module 3 of the conventional construction of FIGS. 1a and 1b, but splits the payload module into two box-like sections 2a, 2b. These are hinged by hinges 39, 40 to the top of the service module (i.e. part way along the length of the spacecraft) and deployed as shown in FIG. 2b.

Non-payload components, such as solar panels, have been folded upright in a zig-zag shape for launch, and have been unfolded for deployment (EP-A-0 064 917). Further, it has been proposed (U.S. Pat. No. 4,964,597) to carry collapsible living quarters as a payload, of cylindrical form, which unhinges for deployment about an axis parallel to the launch axis, to produce living quarters based on two half cylindrical shells side by side.

SUMMARY OF THE INVENTION

The invention provides a spacecraft platform for connection to a launcher, comprising at least two panels which are capable of being folded into an upright configuration when stowed for launch, and which provide structural support for payload components, the panels being coupled together and being arranged to deploy by unfolding about an axis or axes at right angles to the launch axis and at one extremity of the spacecraft platform.

This arrangement provides the maximum payload-carrying length on deployment.

The panels may be flat but could instead be slightly curved e.g. to form part of a paraboloid reflector shape. The panels need not be continuous over their entire area, but could be defined by a peripheral frame with optional cross-members. The panels may be elongate, with their longer dimension extending parallel to the launch axis. There may be two, three, four or more panels in the spacecraft platform. Three or four panels may be coupled via a central member, but two panels are advantageously coupled, e.g. hinged, directed to each other. Latch mechanisms such as pyrotechnic bolts may be provided to fasten the panels together to enable them to sustain flight loads during the launch.

The panels may each have ribs on their rear surfaces which extend parallel to the launch axis, in order to provide stiffening of the surface and, for the same reason, lateral stiffening webs may also be provided.

The panels may be coupled together by at least one hinge, in order to open out into a continuous configuration, but could be coupled by other means e.g. a leaf spring. Alternatively, the panels could be uncoupled during or after deployment to form individual satellites. Hinge drive means which could be an electric or a spring motor could be provided, as could respective latches or other mechanisms to hold the panels in their deployed position.

Advantageously, each panel has attachment means, such as a part-circular bearing surface, for securing to the launch vehicle interface ring, either directly, or indirectly, for example via a payload adaptor ring.

The area of the front faces may be extended by using flaps which fold over the front faces for launch and which may be unfolded to deploy them. The usual solar panel arrays may be provided, but a particularly advantageous development would be to provide solar panels covering the rear face of the panels.

The platform may be so shaped that at least two such platforms can be stowed for launch in the same launch vehicle. The platforms could be stowed for launch one above the other in the upright direction, but preferably each such platform is shaped to be stowed alongside each other such platform, and attachment means may be provided for securing to the launch vehicle interface ring. Further, attachment means may be provided for securing each platform to another such platform.

In the case of one platform stowed in the launch vehicle, the panels will normally be stowed with their front faces pointing towards the launch axis and will deploy with their front faces all pointing in the same direction. In the case of two or more platforms stowed in the same launch vehicle, the panels will not necessarily point towards the launch axis, and the front faces of each platform but not necessarily all platforms, will usually point in the same direction.

Because the panels are load-bearing, satellite components may be carried on one or both sides. Such components include payload components, such as communications antennas, or instruments for sensing, such as radar, telescopes, passive microwave systems, cryogenic instrumentation, and spacecraft sub-systems (payload support systems) such as power systems for powering the payload (which could be solar arrays, batteries or radioisotope power systems), telecommunications systems, attitude and orbit control systems (AOCS), thermal control systems, and propulsion systems. Desirably, the entire payload and payload support systems are mounted on the panels, or on ribs or webs provided on the panels. In other words, the entire spacecraft structure would be folded for stowage and unfolded for deployment. The panels provide a stable support surface of substantial size for an antenna, such as a SAR antenna, or other receiver of electromagnetic radiation. A SAR antenna could be for various applications, surveillance, specific civil Earth observation tasks, interferometric SAR techniques. The panels could be used for other purposes such as to support an interferometer (optical), using the faces of the panels as an optical bench, or for numerous other applications such as meteorological, scientific or communications purposes.

The panels may be of any suitable material e.g. carbon fibre, aluminium alloy.

The invention will now be described in detail with reference to the accompanying drawings, in which:

Like reference numerals have been given to like components throughout all the Figures.

DETAILED DESCRIPTION OF THE INVENTION

Figure 3:
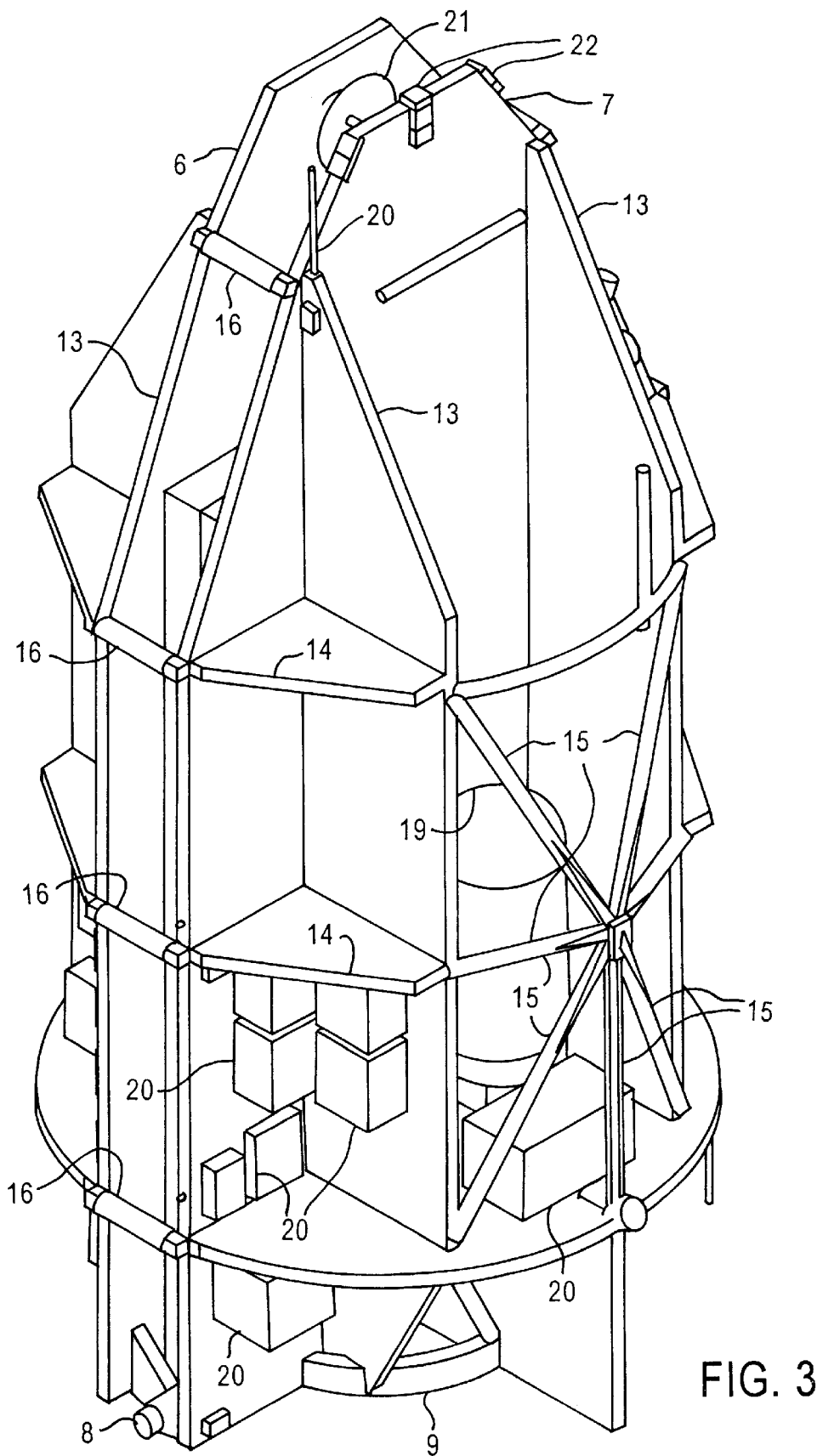
FIG. 3 shows, in stowed form for launch, a spacecraft platform in accordance with the invention, carrying payload and service module components.
Figure 5:
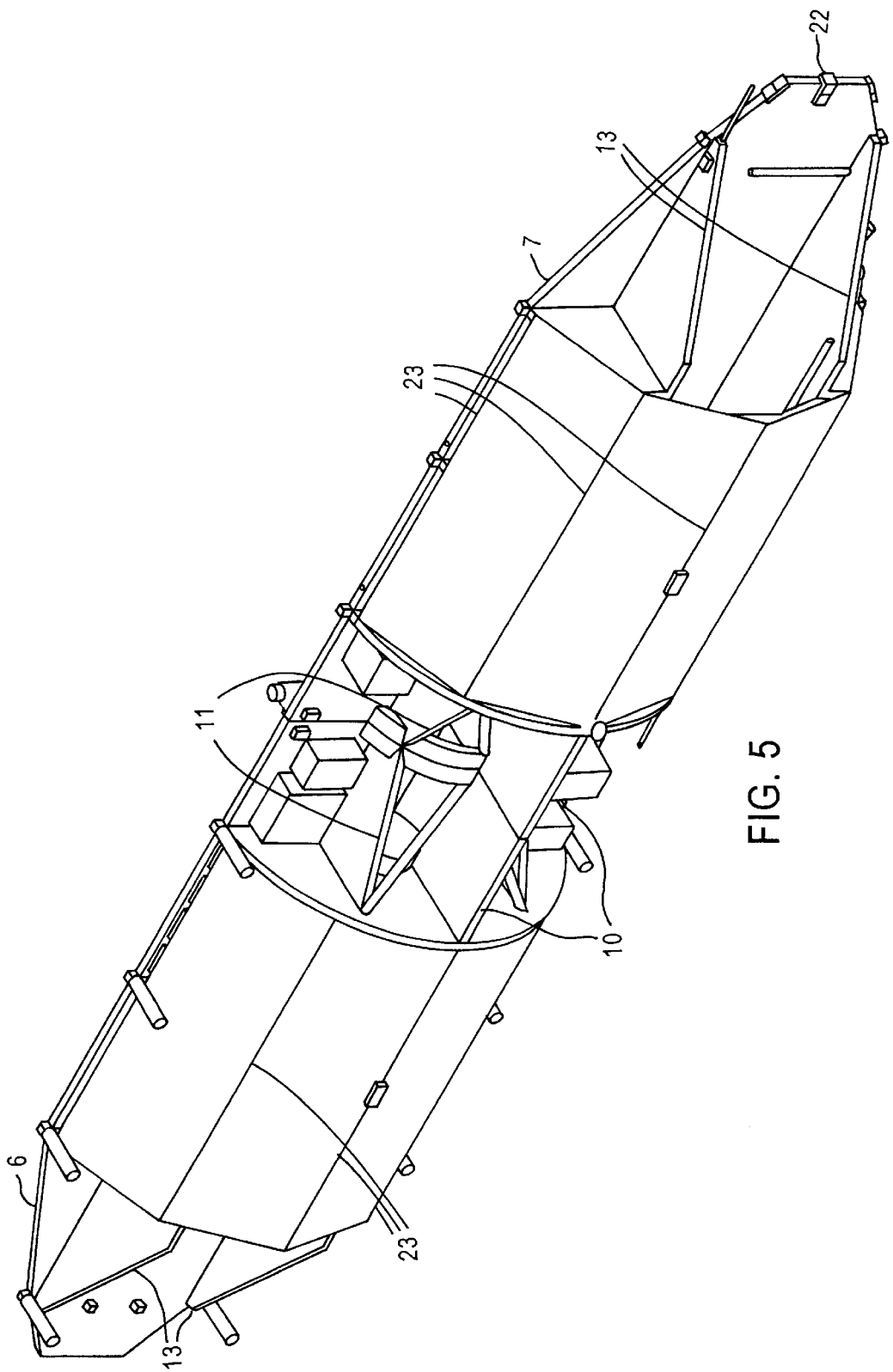
FIG. 5 shows the rear face of the platform of FIG. 3 in its deployed condition.
Figure 6:
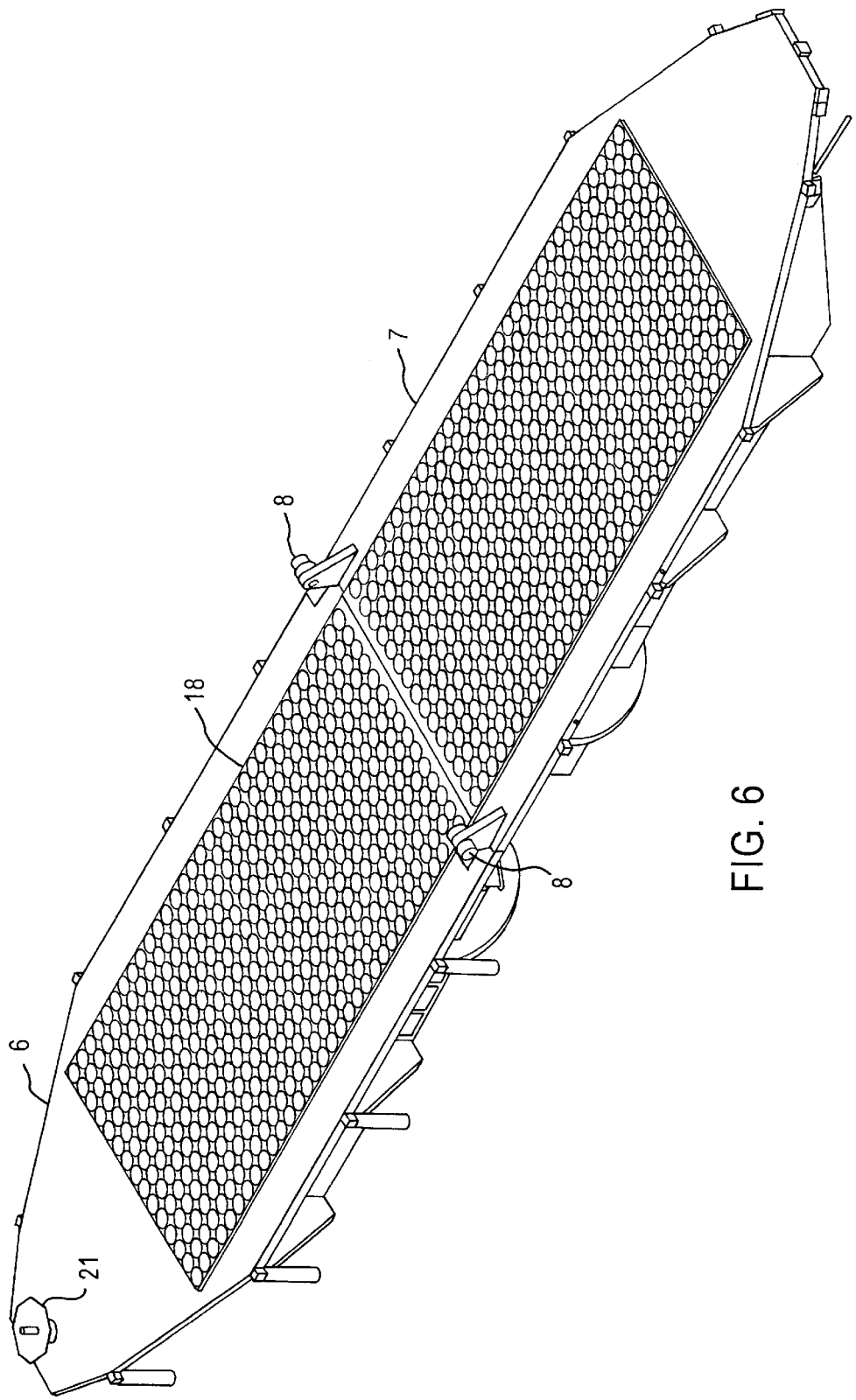
FIG. 6 shows the front face of the platform of FIG. 3 in its deployed condition.

The positioning of payload and service module components and antenna in FIGS. 3, 5 and 6 is a typical arrangement. However, the design is very adaptable, and a wide variety of disposition of components is possible.

The illustrated spacecraft platform has two panels 6, 7 which are coupled together at the base by means of hinges 8. The spacecraft takes up the position shown in FIG. 3 when ready for launch. It is contained in a fairing such as the fairing 5 shown in FIG. 1b and is positioned at the top of a launch vehicle. The launch vehicle has an interface ring which engages a payload adaptor ring which in turn engages the ring formed by the half-rings 9 at the base of the platform. The half rings 9, which form an integral part of the satellite structure, are attached to the launch vehicle by means of explosive bolts (not shown) or clampband. In order to deploy the spacecraft platform, the adaptor ring separates from the launcher interface ring, and the adaptor ring is then itself jettisoned. In some arrangements, the adaptor ring may be deleted altogether, so that the half rings 9 bear directly against the launch vehicle interface ring.

Figure 4:
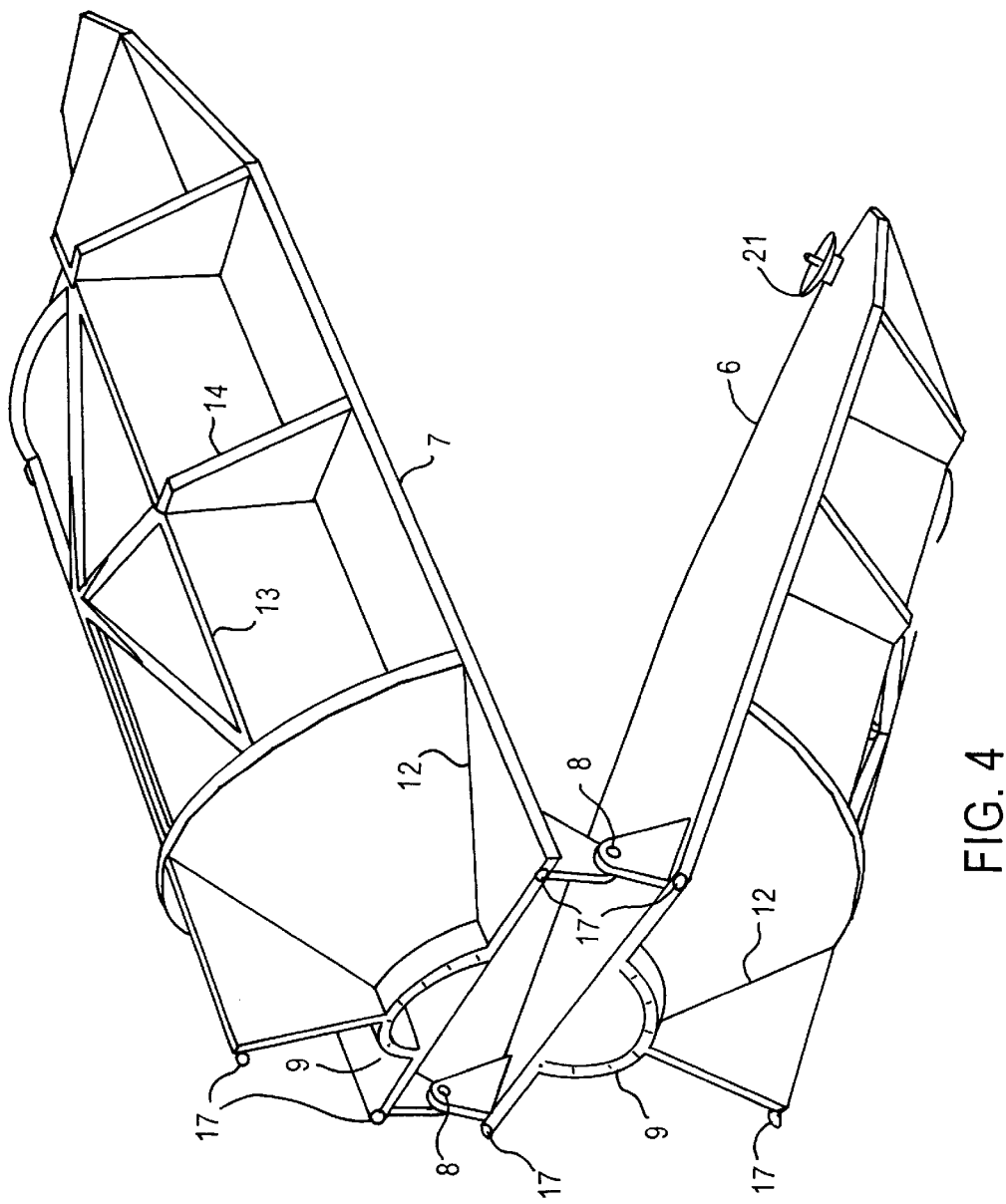
FIG. 4 shows another spacecraft platform, similar to that of FIG. 3 but shown for clarity without payload and service module components, to illustrate the deployment process.

Above the payload interface ring 9 are webs 10, 11 and struts which carry the considerable forces at launch from the planar structures 6, 7 themselves. The only respect in which the platform of FIG. 4 differs from the platform of FIGS. 3, 5 and 6 is that there is a conical structure 12 to carry the inertial forces at launch from the panels 6, 7.

Running down the back of the panels are longitudinal ribs 13. Transverse to these longitudinal ribs are stiffening webs 14.

A number of struts 15 are provided to further stiffen the rear faces of the panels.

The two halves 6, 7 are attached to each other at stiffening rib locations along the length of the panels by release mechanisms 16, which are operated to release the two halves when it is desired to deploy the structure. The release mechanisms could be pyrotechnic bolts, or other types. Release mechanisms of a retractable type are shown in FIGS. 5 and 6. A motor, such as a spring motor or electric motor (not shown) is provided at the base of the platform, to unfold the two halves 6, 7. When the halves are fully extended, attachment points 17 abut corresponding attachment points 17, forming a three-point kinematic mount. A latch (not shown) holds the surfaces in the deployed condition, as shown in FIGS. 5 and 6.

Figure 1A:
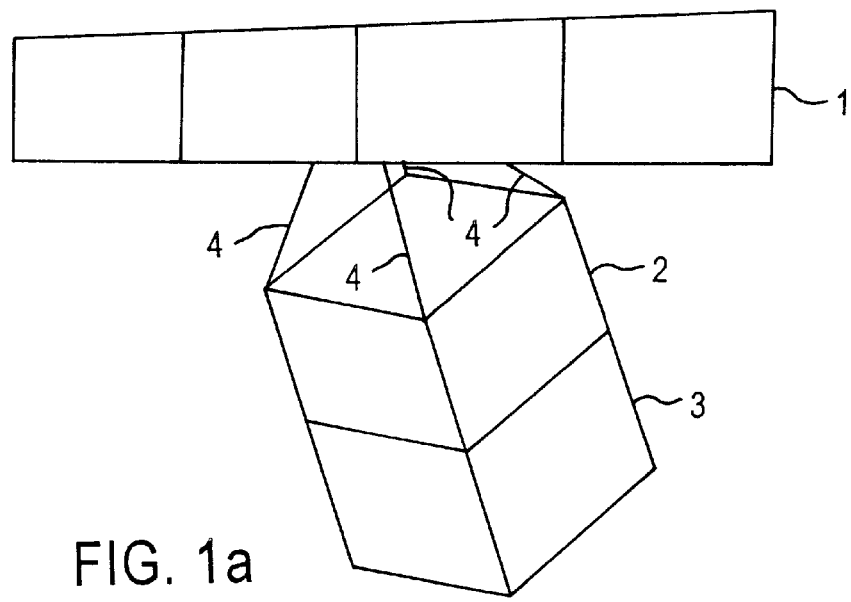
FIG. 1a shows a part of a known satellite in simplified form.
Figure 1B:
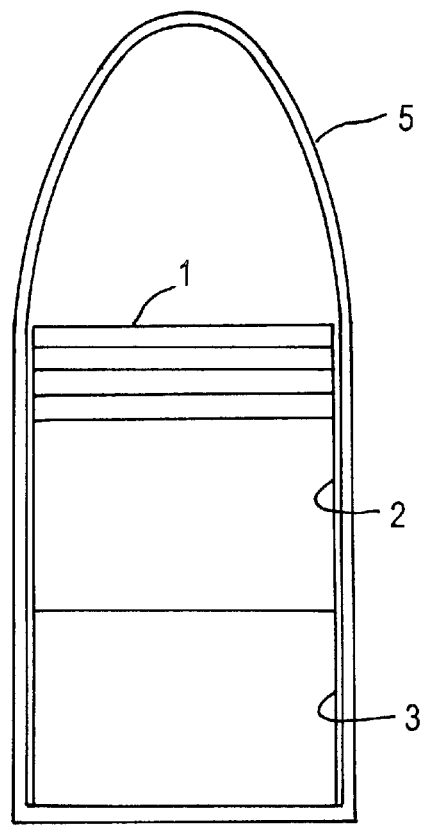
FIG. 1b shows the satellite of FIG. 1, in simplified form, stowed for launch.

A conventional SAR antenna is accommodated on the front faces of the planar structures 6, 7, and there is only one join compared with the three of the prior satellite of FIG. 1. By minimising the number of folds, the number of hinge mechanisms and latch mechanisms is reduced to the minimum and performance of the SAR is improved due to less RF transfer across folds. Stiffness and planarity of the antenna are enhanced.

It should be mentioned that it might be thought that the known spacecraft of FIG. 1 could be adapted by replacing the deployable SAR antenna 1 by a fixed SAR antenna on a face of the platform 2, 3, in order to obtain the advantages of rigidity and reduced number of folds. The advantage with the present invention is that the two panels 6, 7 are contained near the centre diameter of the fairing and therefore have a greater width than the surfaces 2, 3 for the same diameter of fairing, and the design is such that both surfaces can be pointed in the same direction, whereas only one face of the known satellite of FIG. 1 can point in any particular direction, and is of significantly smaller area.

Referring to FIGS. 5 and 6, the SAR antenna, can be readily steered to a different Earth cover footprint. This would involve rotation of the spacecraft about the axis with the least moment of inertia. This is achieved with a high degree of stability.

The spacecraft contains fuel tanks 19 between the stiffening ribs on the rear of each panel 6, 7. Components 20 of the payload and service modules are supported from the rear faces of the panels 6, 7, being either directly mounted on the rear faces of the panels, or on the stiffening ribs or webs secured to the rear faces of the panels. The platform carries telemetry antennas, in order to establish contact with the control station on Earth for general housekeeping control of the spacecraft. One telemetry antenna 20 is provided at the top of one panel in its stowed state, the other (not shown) is provided at the base in the stowed state. Typically, the antenna would be S-band.

A shaped e.g. parabolic dish 21, typically X-band, is a downlink antenna for transmitting the instrument data stream to Earth. Attitude and orbit control (AOCS) sensors 22 are provided for sensing the horizon or the stars.

Solar panels 23 are mounted on the outer surface of the platform i.e. on the outer surfaces of the ribs 13 and the webs 14. Such a fixed arrangement of solar panels has the advantage of rigidity, but if desired, there could be an arrangement of deployable solar panels over the rear of the spacecraft which would rotate relative to the spacecraft either instead of or in addition to the fixed panels.

It is not necessary for the panels 6, 7 to be continuous. They could be formed as a frame with struts running around the periphery of the members 6 and 7, and with cross-struts. Further, there is no need for the panels to be planar, as in the illustrated embodiment. They could be slightly curved e.g. to form part of an offset paraboidal reflector for communication use.

The spacecraft described above may be modified, by providing antennas on the two central surfaces occupied by solar cells (FIG. 5), and using the pairs of sloping surfaces as antennas pointing at different regions of the Earth, mounting the solar array on the surface carrying the antenna 18, which could pivot to deploy to a suitable orientation. Indeed, such an arrangement could be modified by replacing the two ribs 13 with one central rib, and employing a single antenna surface from the rib to each side of the panels 6, 7. If desired, one or each of the antenna surfaces could pivot about the top of the rib to form a continuous surface with the other antenna surface, i.e. either of the sloping antenna surfaces could then be doubled in size.

The invention is not restricted to spacecraft platforms carrying radar antennas. In particular, the panels 6. 7 may act as an optical bench for optical components. A camera images in a manner different from a SAR. However, one or more cameras or all of the elements that comprise such cameras can be accommodated within the structure of the spacecraft and can take particular advantage of the intrinsic rigidity of the spacecraft structure. Although the field of view of such cameras can be directed by means internal to the cameras, the fields of view can additionally and conveniently be directed by the rapid rotation capability of the satellite that results from the satellite's intrinsic rigidity. Additionally, the field of view and the camera or cameras can be directed from within the cameras without compromising the attitude pointing provided by the satellite. Such camera or cameras can be implemented as the main satellite payload or as part of a combined payload comprising for example a SAR and camera or cameras. The imaging of features at high resolution requires that the entrance pupil to the camera be large. Such a requirement is well supported by the new satellite because its structure is sufficiently large to accommodate the larger required diameters.

There is no requirement for the individual panels to be coupled together. If desired, the panels could form individual satellites. Further, it is not essential for the panels to be coupled so that they deploy by unfolding about an axis in the vicinity of the connection of the spacecraft platform with the launcher i.e. at the lower extremity of the panels. If desired, the panels could unfold about an axis normal to the launch axis at the upper extremity of the panels.

Further, the invention is not restricted to the use of two panels. Thus, three panels the base of which forms a triangle may be constructed, or four panels the base of which forms a rectangle or square could be produced. In each case, the hinge structure would be the same, and each panel could have a part-circular bearing surface (not shown) similar to the half rings 9 of FIGS. 3, 4 (except of course extending through less than 180°). To reduce the load on the hinges at launch, the central member containing opening 31 could also bear against the payload adaptor ring.

Figure 7:
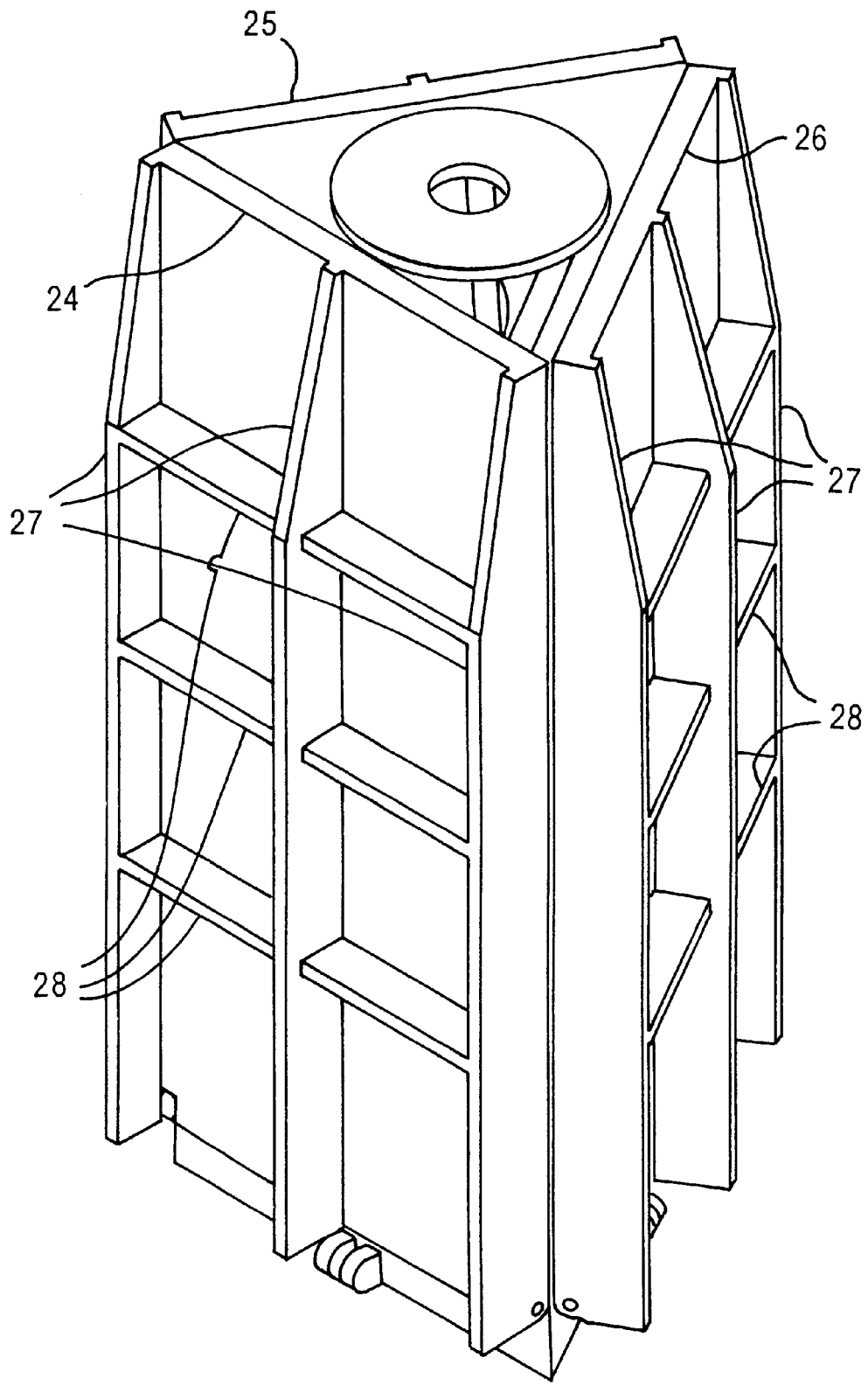
FIG. 7 shows, in stowed form for launch, another spacecraft platform in accordance with the invention.
Figure 8:
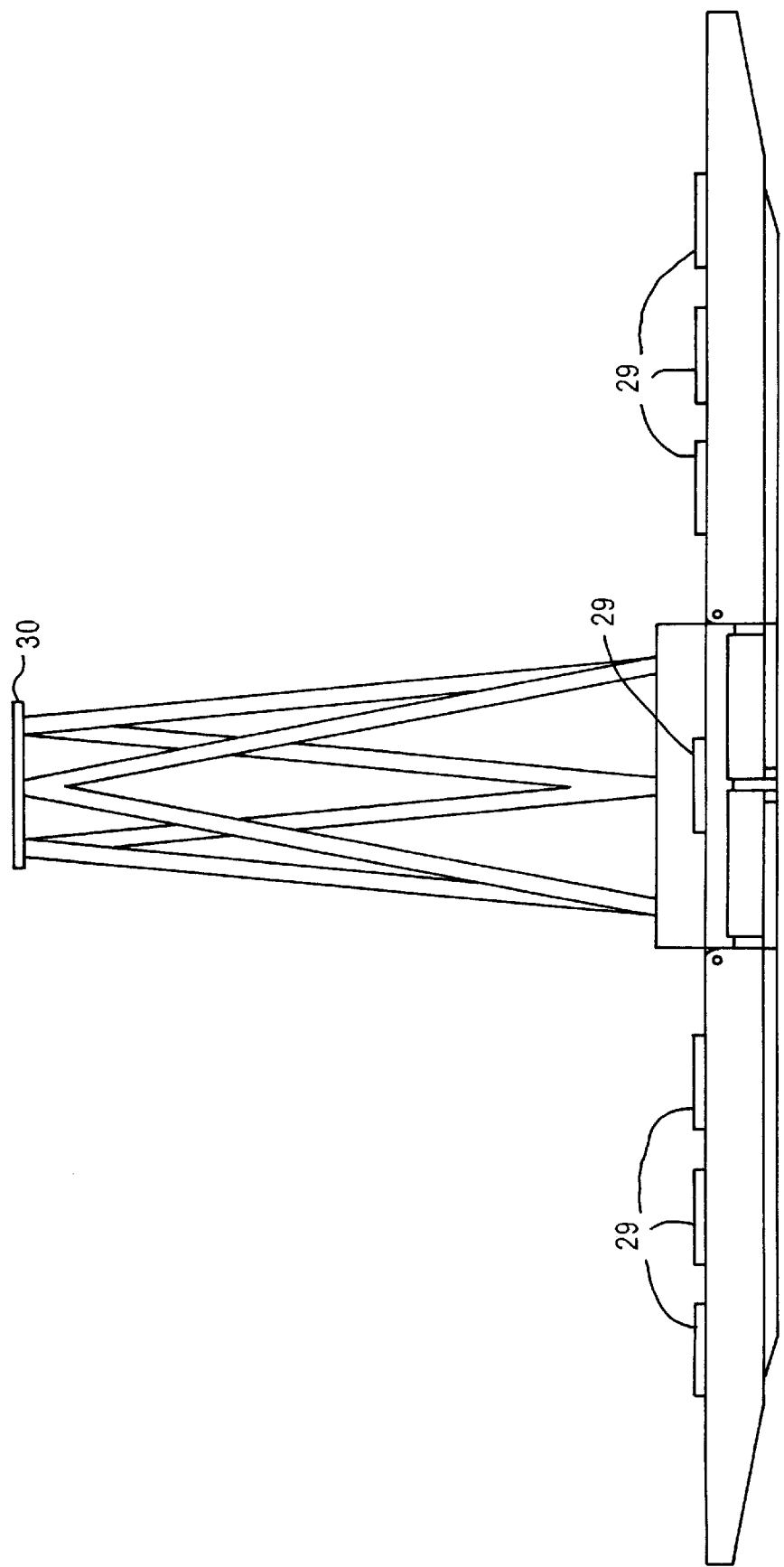
FIG. 8 is a side view of the platform of FIG. 7 in its deployed condition.
Figure 9:
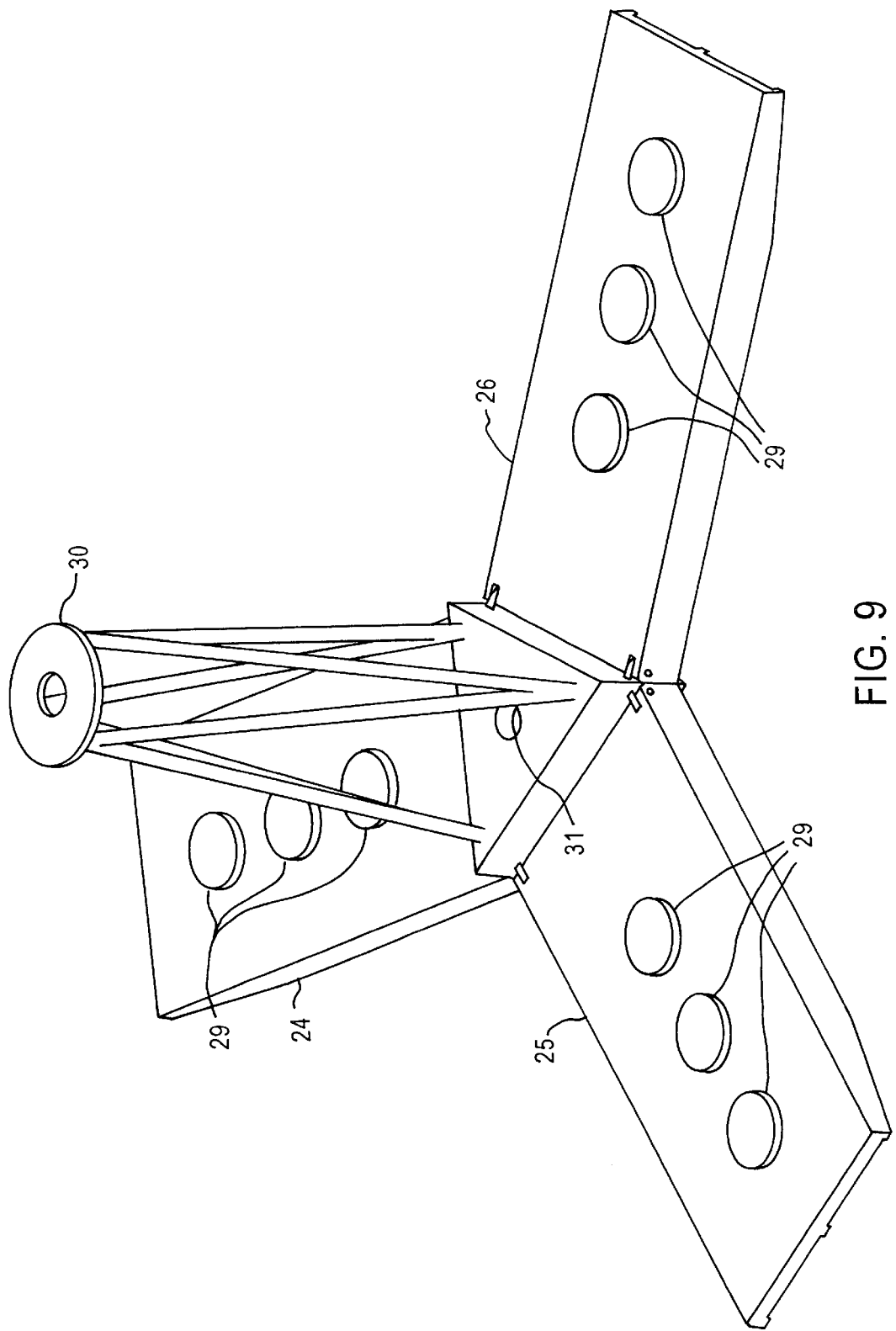
FIG. 9 shows the platform of FIG. 7 in perspective view in its deployed condition.

An example of the way in which such a structure could be used is shown in FIGS. 7 to 9. This is an interferometer. Panels 24 to 26 are provided with longitudinal ribs 27 and cross-webs 28 on their rear surfaces. Their front surfaces carry mirrors 29. These mirrors reflect radiation to a secondary reflector 30. The radiation is then reflected down to a plane within which interference can take place via opening 31. In this way, interferometric data can be produced from which very high resolution images may be created. Such imagery requires interferometric data from at least three non-parallel base lines. The resolution achievable is inversely proportional to the length of those base lines. Typically, in a conventional optical sensing satellite, the maximum resolution achievable is set by the diameter of the launcher fairing. In the invention, deployment of the three or more panels allows optical elements to be placed at their outer ends so that the maximum length of interferometer base line is set in the region of twice the height of the stowed satellite rather than the satellite diameter. Typically, the height of the fairing is in the region of twice its diameter so that, with the invention, resolutions can be achieved that are three or four times better than with conventional satellites.

As a further modification, two or more platforms of the kind described above may be stowed for launch in the same launch vehicle.

Figure 10:
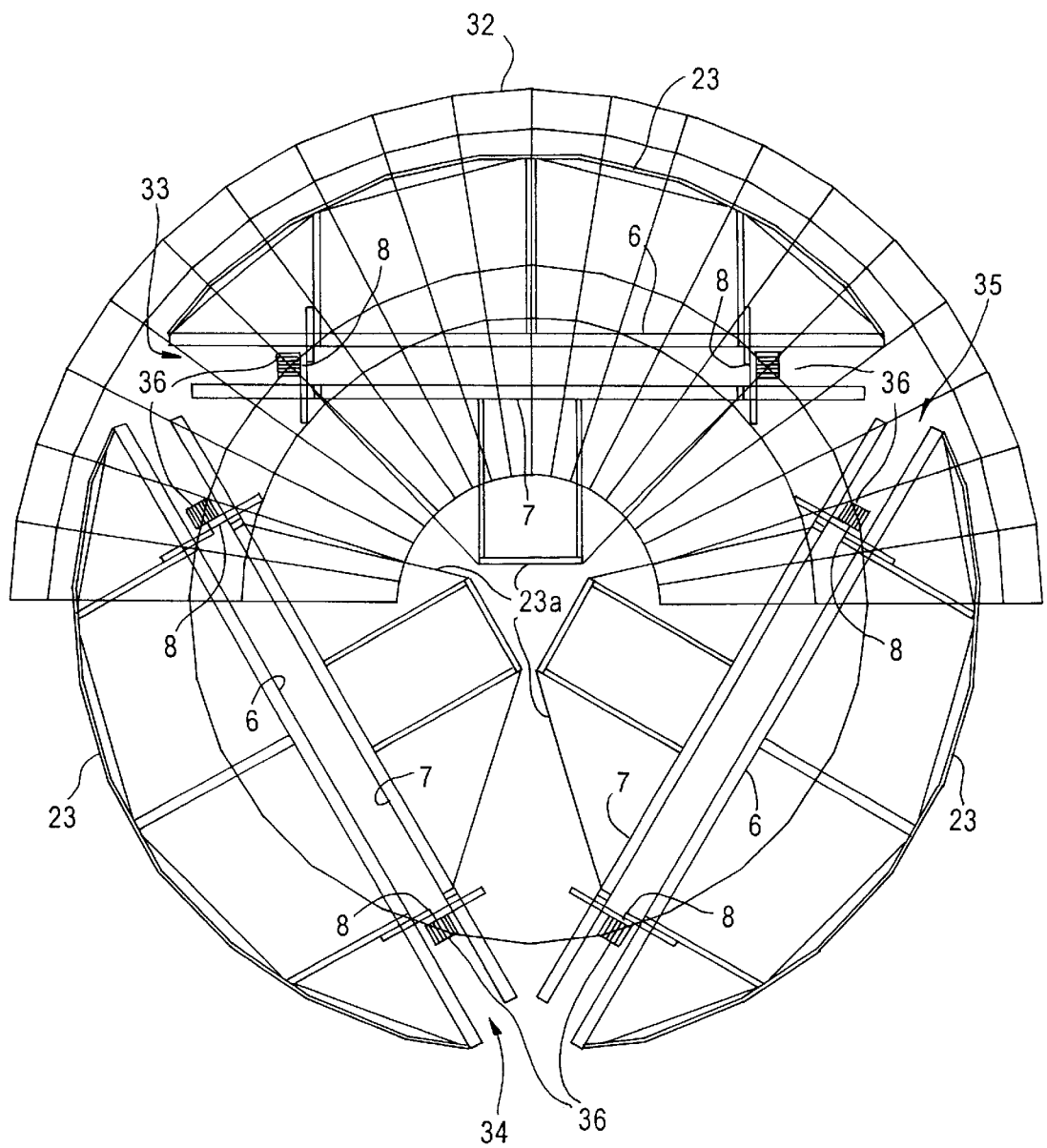
FIG. 10 is a plan view, partly cut away, of a launch vehicle with multiple spacecraft platforms therein.

Referring to FIG. 10, the launch vehicle is seen from above, the fairing 32 being shown schematically. The fairing contains three spacecraft platforms which are each similar to the spacecraft platforms shown in FIGS. 3, 5 and 6.

Thus, each spacecraft platform comprises two panels 6, 7 which are coupled at the base by means of hinges 8. When deployed as shown in FIG. 5, each of the spacecraft platforms 33, 34 and 35 has instrumentation such as a radar antenna on one face (the face defined by the surfaces of the panels 6 and 7 which face each other in FIG. 10), and solar panels 23 on the other face. The solar panels are not illustrated on the outward facing side of panel 7, and instead the primary structure 23a required to provide adequate strength and stiffness to the panel is shown. A lightweight secondary structure (not shown) carried by the primary structure supports the solar panels.

The three spacecraft platforms 33 to 35 are equally spaced around the launch axis. Latch mechanisms (not shown) couple the three spacecraft platforms together to form a rigid structure for launch, so that the complete assembly is capable of withstanding flight loads during launch. Thus, a supplementary load bearing structure such as a central pillar to support the multiple platforms (as is commonly provided for the launch of multiple conventional spacecraft), is not required. The halves 6, 7 of each spacecraft platform are attached to each other by release mechanisms as in FIGS. 3, 5 and 6.

The rigid structure formed by the three spacecraft platforms is bolted to the payload adaptor ring, itself bolted to the interface ring of the launch vehicle.

In operation, when it is designed to deploy the spacecraft platforms, a release mechanism at the interface ring of the launch vehicle is operated to separate the launcher from the structure 33 to 35, and thereafter the adaptor ring is jettisoned. The latch mechanisms which hold the spacecraft platforms together are then operated, and springs (not shown) provided a radial separation velocity for the individual spacecraft platforms to clear each other. The springs could be integrated into the latch mechanisms, or centrally located along the launch axis.

The release mechanisms for the two halves 6, 7 of each spacecraft platform are finally operated and the spacecraft platforms are deployed using for example motors 36.

Figure 11:
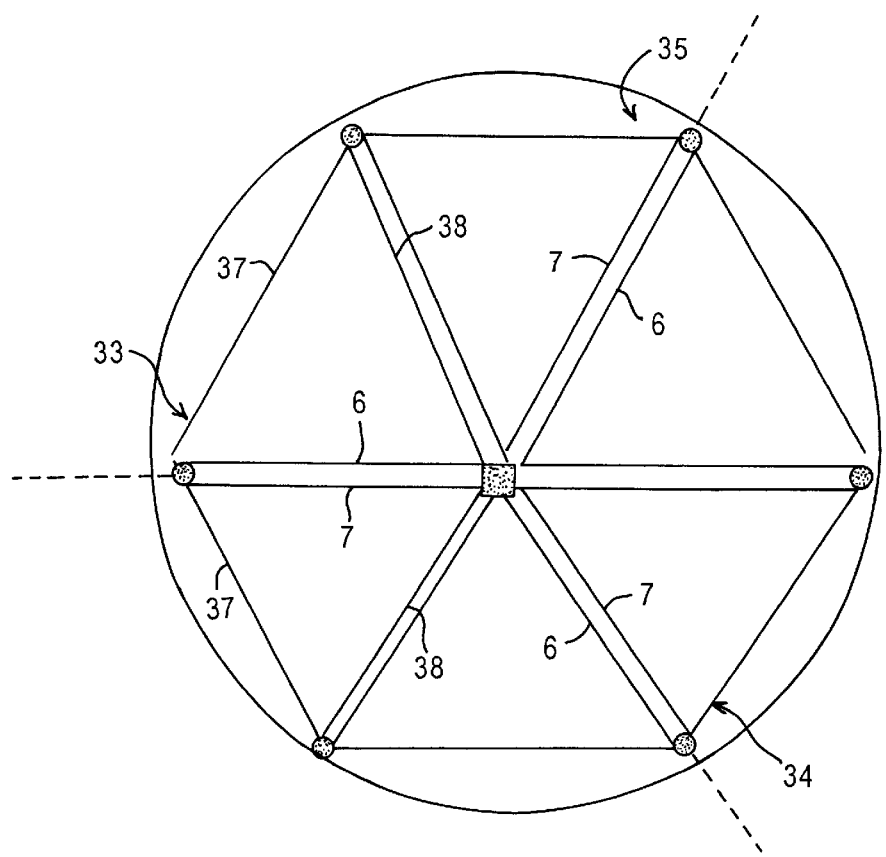
FIG. 11 is a plan view in schematic form of a launch vehicle with a multiple spacecraft platform arranged in a different configuration.
Figure 2A:
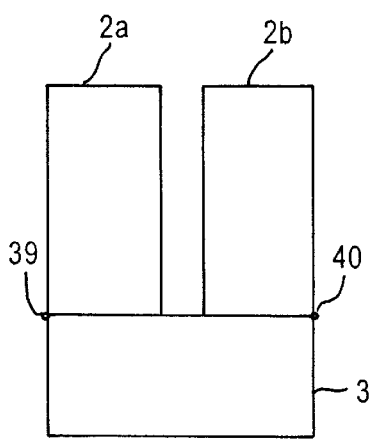
FIG. 2a shows a part of a known satellite in schematic form in a stowed condition.
Figure 2B:
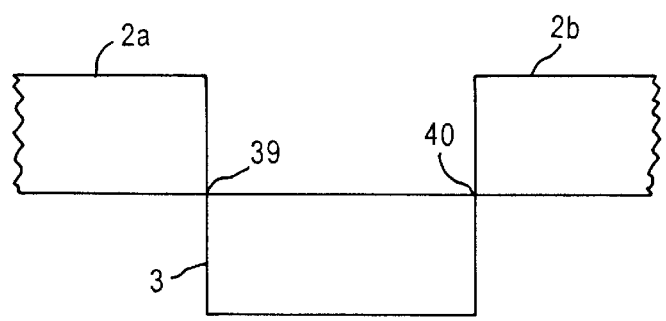
FIG. 2b shows a part of the known satellite of FIG. 2a in a deployed condition.

FIG. 11 shows an alternative arrangement of three spacecraft platforms 33 to 35. Each of the spacecraft platforms is similar to the spacecraft platform described with reference to FIGS. 3, 5 and 6. In this case, the rear faces of the spacecraft platform form two surfaces 37, 38 which are inclined to each other, in the deployed state. On or from one of the surfaces 37, 38 could for example be deployed a solar array, while the other could form a radiator to dissipate heat generated from the components forming part of the spacecraft payload. The front surface of the spacecraft platform i.e. that defined by the surfaces of the panel 6 and 7 which face each other in the stowed state shown in FIG. 11. could form an antenna or support for other instrumentation.

The hinge lines of the spacecraft platforms are arranged radially in FIG. 11, whereas they are arranged to form a triangle in FIG. 10. Apart from that, the securing of the spacecraft platforms 33 to 35 to each other and to the launch vehicle, and the securing of the parts of each platform to each other, and the deployment, are all the same as for the embodiment of FIG. 10.

Each spacecraft platform provides a deployable structure that has a very high stiffness when both stowed for launch and when deployed in orbit. The panels 6, 7 of each deployable structure can be used to support both payload elements and spacecraft platform subsystems, each of which can have high mass.

For each embodiment, it is not necessary for there to be three such spacecraft platforms in the multiple launch configuration. Two or more than three, for example four, spacecraft platforms could be accommodated. In addition, a whole additional layer of multiple spacecraft platforms could be provided above the set attached to the payload adaptor ring, particularly if each panel was short in length. This would even be applicable to the single spacecraft platform of FIGS. 1 to 9. The lower layer(s) could carry the loads produced by those above, so that a supplementary structure, such as is conventionally provided for known spacecraft stacked in layers, would not be required.

We claim:

1. A spacecraft platform for connection to a launch vehicle, comprising at least two panels which are capable of being folded into an upright configuration when stowed for launch, and which provide structural support for payload components, the panels being coupled together and being arranged to deploy by unfolding about an axis at right angles to the launch axis and at one extremity of the spacecraft platform, at least one panel having attachment means for releasably securing to co-operating means associated with the launch vehicle.

2. A spacecraft platform as claimed in claim 1, in which the panels are arranged to deploy by unfolding about an axis adjacent the spacecraft platform/launcher interface.

3. A spacecraft platform as claimed in claim 1, in which each panel has attachment means for securing to the interface ring of the launch vehicle.

4. A spacecraft platform as claimed in claim 3, in which the attachment means includes a bearing surface extending lengthwise part-way along the circumference of a circle.

5. A spacecraft platform as claimed in claim 1, in which the panels are coupled together by at least one hinge, and drive means is provided to pivot the panels about the hinge to deploy the spacecraft.

6. A spacecraft platform as claimed in claim 1, in which each panel has ribs on its rear face which extend parallel to the launch axis.

7. A spacecraft platform as claimed in claim 6, in which each panel has webs on its rear face which extend transverse to the axis of the launch vehicle.

8. A spacecraft platform as claimed in claim 1, in which the panels are elongate, the longer dimension being parallel to the launch axis.

9. A spacecraft platform as claimed in claim 1, in which there are two panels hinged directly to each other.

10. A spacecraft platform as claimed in claim 1, in which the platform is so shaped that at least two such platforms can be stowed for launch in the same launch vehicle.

11. A spacecraft platform as claimed in claim 10, in which each such platform has attachment means for releasably securing to co-operating means associated with the launch vehicle.

12. A spacecraft platform as claimed in claim 10, including attachment means for releasably securing to another platform.

13. A spacecraft platform as claimed in claim 1, in which payload components are supported from the rear faces of the panels.

14. A spacecraft platform as claimed in claim 1, in which the rear surface of the panels are covered by solar panels.

15. A spacecraft platform as claimed in claim 1, in which one face of the panels carry an antenna of a synthetic aperture radar.

16. A spacecraft platform as claimed in claim 1, in which one face of the panels carries an interferometer.

17. A spacecraft platform as claimed in claim 1, in which the spacecraft sub-system components are supported from the rear faces of the panels.

* * * * *